United States Patent [19]

Tjahjadi et al.

[11] Patent Number: 5,018,166

[45] Date of Patent: May 21, 1991

[54] METHOD AND APPARATUS FOR BAUD TIMING RECOVERY

[75] Inventors: Taruna Tjahjadi, Duluth; Cynthia J. Correa, Alpharetta, both of Ga.

[73] Assignee: Hayes Microcomputer Products, Inc., Norcross, Ga.

[21] Appl. No.: 419,077

[22] Filed: Oct. 10, 1989

[51] Int. Cl.$^5$ .................................................. H03G 5/16
[52] U.S. Cl. ..................................... 375/12; 375/106; 364/724.2
[58] Field of Search .......................... 375/12, 14, 106; 333/18; 364/724.1, 724.2

[56] References Cited

U.S. PATENT DOCUMENTS

| | | | |
|---|---|---|---|
| 4,061,978 | 12/1977 | Motley et al. | 375/14 |
| 4,145,747 | 3/1979 | Sakaki et al. | 375/14 |
| 4,146,840 | 3/1979 | McRae et al. | 375/12 |
| 4,302,631 | 11/1981 | Shenoi et al. | 364/724.1 |
| 4,351,060 | 9/1982 | Treiber | 375/12 |
| 4,411,000 | 10/1983 | Kustka | 364/724.2 |
| 4,567,599 | 1/1986 | Mizoguchi | 375/106 |
| 4,621,366 | 11/1986 | Cain et al. | 375/106 |

OTHER PUBLICATIONS

Richard D. Gitlin et al., "Center-Tap Tracking Algorithms for Timing Recovery", AT&T Technical Journal, Nov./Dec. 1987, vol. 66, Issue 6, pp. 63-78.
Amine Haoui et al., "An All-Digital Timing Recovery Scheme for Voiceband Data Modems", ICASSP, 1987, pp. 1911-1914.

Primary Examiner—Benedict V. Safourek
Assistant Examiner—Young Tse
Attorney, Agent, or Firm—Jones, Askew & Lunsford

[57] ABSTRACT

A data communications receiver for use in a modem. A fixed sample clock and a dominated tap tracking algorithm lock the local baud timing in the receiver to the baud timing in a remote transmitter. An interpolating filter provides a plurality of discrete delays. A filter control circuit inspects the tap coefficients of an adaptive equalizer to determine the location of and any movement of the dominant tap. The filter control circuit selects the rate of cycling through the discrete delays to compensate for any frequency difference between the local baud timing and the remote baud timing, and to prevent movement of the dominant tap. A baud detector circuit monitors the sample clock and the operating state of the filter control circuit to identify the end of a baud and detects and corrects for any frequency difference between the remote baud timing and the local baud timing by providing one additional sample or one less sample to the adaptive equalizer. A bit clock circuit monitors the operation of the baud detector and adjusts the bit clock frequency to compensate for the additional or discarded sample.

43 Claims, 8 Drawing Sheets

METHOD AND APPARATUS FOR BAUD TIMING RECOVERY

TECHNICAL FIELD

The present invention relates to clock synchronization circuits and, in particular, describes a method and apparatus for locking local baud timing to remote baud timing.

BACKGROUND OF THE INVENTION

In order to properly recover the data contained in a received signal a data communications receiver, such as a modem, must synchronize its baud clock with the baud clock of the remote transmitter. Typically, the clock in the local device and the clock in the remote device will both be crystal controlled and therefore the local baud clock and the remote baud clock, even without a synchronization circuit, typically differ less than 0.02 percent in frequency. However, even with this small offset in frequency, the cumulative phase difference between the two baud clocks eventually becomes large enough to cause errors in the data transfer.

Modern modems use an analog-to-digital (A/D) converter to periodically sample the received analog signal and convert it to a digital format to provide a sampled, digitized signal, and one or more microprocessors to process the digitized signal and recover the data being transferred. Two types of sampling clocks for the A/D converters are used: a variable frequency sampling clock; and a fixed frequency sampling clock. When a variable frequency sampling clock is used the recovered baud clock is used to adjust the frequency and/or phase of the sampling clock so that the sampling frequency, when divided by the appropriate number (typically an integer), yields the baud frequency and causes the local baud clock to be locked on to the remote baud clock.

Fractionally spaced adaptive equalizers can readily compensate for timing-phase variations between the remote transmitter baud clock and the receiver baud clock. When there is a frequency difference between these clocks the equalizer compensates for the accumulated timing-phase difference by shifting the equalizer tap weights in the appropriate direction along the delay line. The spatial distribution of the equalizer coefficients can be used to adjust the receiver sampling frequencies so that the local and remote baud clocks are synchronized. The common envelope-derived timing recovery system is replaced with a closed-loop center-tap tracking algorithm. The receiver is locked to the transmitter in a closed-loop manner by observing the distribution of the equalizer tap weights. The receiver sampling clock is then adjusted so as to maintain the dominant tap weights in the center of the equalizer. However, in order to obtain the desired frequency and/or phase resolution for the sampling clock, a very high frequency master clock is typically used in conjunction with a programmable divider chain which provides the sampling clock. Typically, this divider chain and/or the sampling clock are used to generate other clocks used by the modem. Therefore, adjusting the frequency and/or phase of the sampling clock frequently requires that additional steps be taken to prevent or compensate for changes in frequency of these other clocks.

With a fixed sampling clock frequency the sampled, digitized signal is interpolated to a high sampling rate and then decimated down to the signal processing rate under the control of a timing function. The timing function determines which of the interpolated samples correspond to the optimal sampling points and are to be used. An envelope-derived timing recovery system is typically used with this technique. However, the envelope-derived timing recovery technique can be plagued by considerable timing jitter, especially when the channel bandwidth is fully used by a narrow roll-off system or when the channel is severely attenuated at the band edge.

Therefore, there is a need for a baud timing recovery scheme which provides for the use of a fixed frequency for the sampling clock but does not use envelope-derived timing recovery.

There is also a need for a baud timing recovery scheme which uses a fractionally spaced adaptive equalizer to lock the local receiver baud timing to the remote transmitter baud timing without having to adjust the frequency of the sampling clock.

SUMMARY OF THE INVENTION

The present invention provides a method and apparatus for baud timing recovery using a fixed sampling frequency in conjunction with a dominate tap tracking algorithm. More particularly described, the present invention provides a method and apparatus for locking the baud timing of a local receiver to the baud timing of a remote transmitter by using a fixed sampling frequency, a plurality of interpolating filters which provide selectable delays to compensate for frequency differences, a fractionally spaced adaptive equalizer to compensate for phase differences, and a filter control circuit which controls the selection of the interpolating filter which is in use at a particular instant, adds or deletes samples so as to provide the proper number of samples per baud to the adaptive equalizer, and controls of the frequency of the bit clock.

Briefly summarized, the present invention uses a fixed sampling clock to obtain samples of a received signal, an interpolating filter to provide a selected delay, a fractionally spaced adaptive equalizer which provides a set of complex coefficients, and a control circuit for determining the location of the dominant filter tap and for cycling through the bank of interpolating filters at the rate necessary to keep the dominant tap from moving and eventually "falling off" the adaptive equalizer. The control circuit inspects the filter coefficients provided by the adaptive equalizer to determine the dominant filter tap position, determines whether the dominant filter tap position is moving or is stationary, and adjusts the rate of cycling through the interpolating filter so as to cause the dominant filter tap position to remain stationary. The control circuit also adds a sample or discards a sample, as appropriate and at an appropriate time, so that the correct number of samples per baud will be provided to the adaptive equalizer.

More particularly described, the present invention provides for determining the difference between a preferred dominant filter tap position and the current dominant filter tap position, integrates this difference, and uses this integrated difference to periodically update a filter pointer. The filter pointer designates which of the interpolating filters is to be used at a particular time. If the clocks in the remote transmitter and the clocks in the local receiver have precisely the same frequency then, once an interpolating filter is selected, that filter will remain selected. However, these clocks usually differ, even though by a small amount, and this causes the filter pointer to cycle through the bank of interpolating filters at a rate necessary to compensate for the frequency difference. The larger the difference in frequency the more rapid will be the rate at which the filter pointer cycles through the bank of interpolating filters. Typically, the rate at which the filter pointer cycles through the bank of filters is made during initial handshaking between the remote device and the local device and, once determined, the rate will generally remain constant.

The present invention applies a sum-of-the-squares technique to the filter coefficients provided by the adaptive equalizer in order to locate the dominate filter tap. The dominate filter tap, by definition, will have the larges sum-of-the-squares. The current dominant filter tap position is compared with a stored (preferred) dominant filter tap position. If the stored value is greater than the current value then the stored value is used to update the filter pointer. However, if the current value is greater than the stored value then the current value is used to update the filter pointer and is also stored so as to become the stored value for future comparisons.

The difference between the current dominant filter tap position and the stored dominant filter tap position is integrated so that even small errors between the clock rates are compensated for. Furthermore, the integrated signal is used to update a filter pointer register whose contents indicate the appropriate interpolating filter to be used. The integrated signal is added to the least significant bits of the filter pointer register and the filter pointer designation is obtained from a predetermined number of the most significant bits of the filter pointer register. This assures that the integrated signal does not cause the filter pointer to change so quickly as to cause data errors or break the synchronization between the remote and local clocks. However, the integrated signal, when repetitively added to the contents of the filter pointer register, will cause the filter pointer to change from designating one interpolating filter to designating a next interpolating filter.

At some point the interpolating filters will rollover from providing maximum delay to providing minimum delay. This rollover condition indicates that the sampling frequency is incorrect and that the cumulative error in the sampling frequency has caused an incorrect number of samples per baud to be taken. Therefore, a sample is skipped or an additional sample is used, so that the correct number of samples per baud is always passed to the adaptive equalizer. Because the sample clock frequency is fixed adding or skipping a sample causes the local baud timing to change so as to be resynchronized to the remote baud timing. However, the number of bits per baud provided to the other receiver circuitry (decoders, descramblers, etc.) needs to remain constant. Therefore, the bit clock frequency is adjusted whenever the baud timing is adjusted so that the correct number of bit clock pulses per baud is always provided.

Therefore, it is an object of the present invention to provide a method and apparatus for recovering baud timing by using a fixed frequency for the sampling clock and by using interpolating filters to compensate for the difference between the local clock and the remote clock.

It is a further object of the present invention to provide a method and apparatus for recovering baud timing by using a bank of interpolating filters to prevent movement of the dominant filter tap position of a fractionally spaced adaptive equalizer.

It is a further object of the present invention to provide a method and apparatus which uses the filter coefficients of an adaptive equalizer to determine the location of and any movement of the dominant tap in the adaptive equalizer and adjust the rate at which a pointer cycles through a bank of interpolating filters so as to compensate for the frequency difference between the remote clocks and the local clocks and thereby fix the position of the dominant tap.

It is a further object of the present invention to synchronize local baud timing to remote baud timing by varying the decimation rate so that a fixed number of samples per baud is provided to the adaptive equalizer when the number of samples per baud before decimation is variable.

It is a further object of the present invention to provide a bit clock which is synchronized to the local baud timing and provides a fixed number of bit clock pulses per baud independent of the actual duration of a baud.

DETAILED DESCRIPTION

Figure 1:
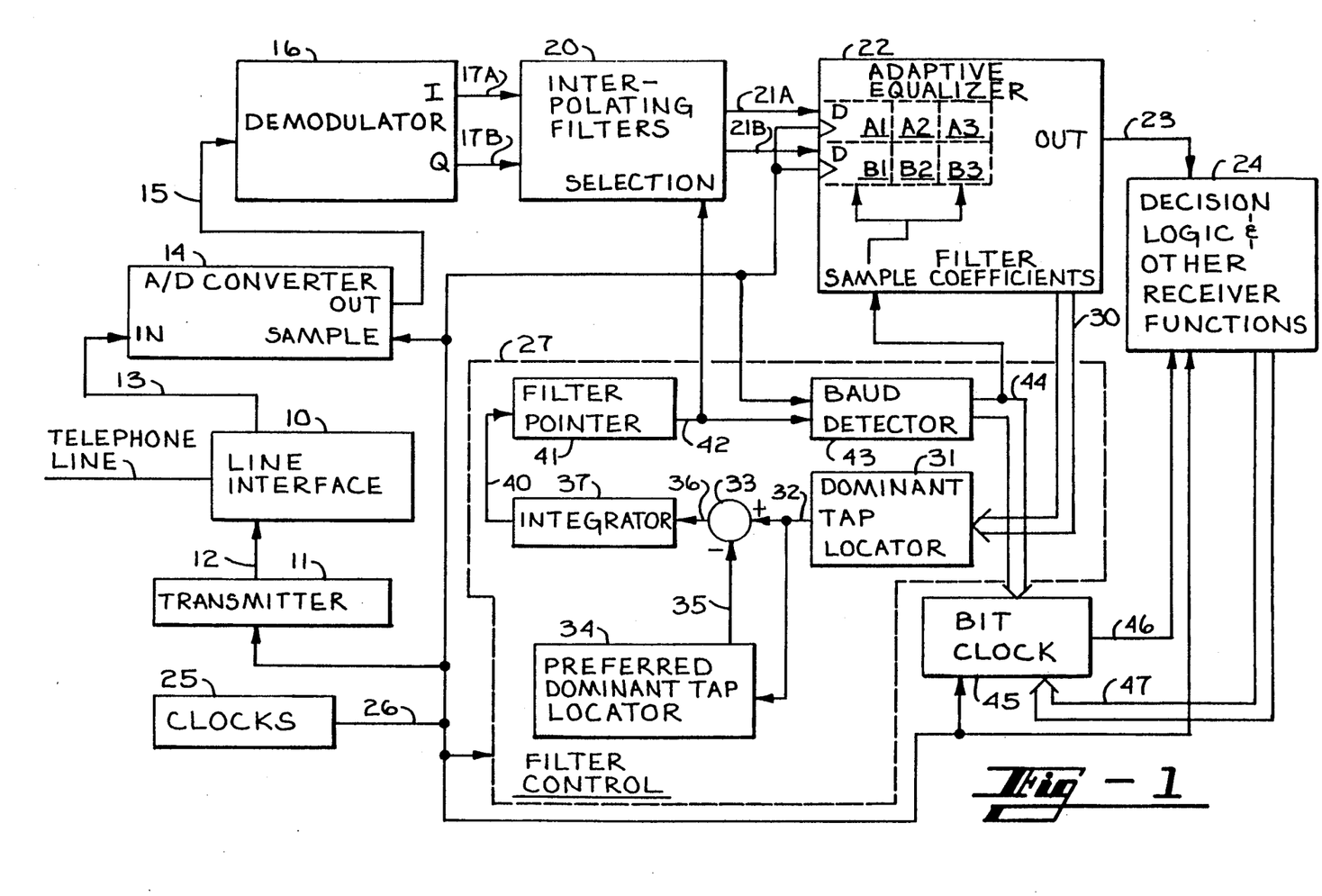
FIG. 1 is a block diagram of the preferred embodiment of the present invention in its preferred environment.

Turn now to the drawing, in which like numerals represent like components throughout the several figures. FIG. 1 is a block diagram of the preferred embodiment of the present invention in its preferred environment. The preferred environment of the present invention is in a data communications device, such as a modem. A telephone line is connected to a line interface 10. Line interface 10 is connected to modem transmitter 11 via conductor 12. Line interface 10 accepts signals from modem transmitter 11 and places these outgoing signals on the telephone line. Line interface 10 also separates incoming signals on the telephone line and provides them to A/D converter 14 via conductor 13. It should be understood that a line, such as line 13, is representative of any signal path and if referred to as a conductor or a bus simply for convenience. Converter 14 samples the incoming signal on conductor 13, digitizes the signal, and provides the sampled, digitized signal to demodulator 16 over conductor 15. Demodulator 16 converts the sampled signal on conductor 15 into a received baseband data signal having inphase (I) and quadrature (Q) components. In the preferred embodiment, demodulator 16 is a Hilbert transform demodulator, although other types of demodulators can be used provided that they provide the appropriate I and Q outputs. The I and Q outputs of demodulator 16 are connected by conductors 17A and 17B, respectively, to the inputs of interpolating filters 20. Interpolating filters 20 represents a bank of 32 delay lines, each delay line having a different delay. In the preferred embodiment, each part (I,Q) of interpolating filters 20 is implemented by an 8-stage shift register which is clocked at the sampling frequency. The set of eight outputs (one from each stage) is multiplied by a set of eight coefficients and the resulting products are summed to provide the interpolated output signal. There are 32 sets of coefficients, so 32 different filters can be simulated. The 32 filters provide 32 different time delays. The time delay between different filters is preferably an integer multiple of $1/(FS \times 32)$, where FS is the sampling frequency which, in the preferred embodiment, is 9600/second. The particular filter and corresponding delay are determined by the SELECTION input.

If the sample clock is running fast then, with a fixed delay being provided by filter 20, the dominant tap will move toward one end of adaptive equalizer 22. Filter control 27 therefore selects a cycle rate at which filter 20 provides increasingly greater delays so that the resultant time between samples is as if the local and remote baud clock frequencies were perfectly matched. The dominant tap on the adaptive equalizer therefore stops moving and is stable. If the sample clock is running slow then, with a fixed delay being provided by filter 20, the dominant tap will move toward the other end of adaptive equalizer 22. Filter control 27 therefore selects a cycle rate at which filter 20 provides successively decreasing delays so that the resultant time between samples will also be as if the local and remote baud clock frequencies were perfectly matched. If the local and remote baud clock frequencies are perfectly matched then filters 20 will be selected to provide a fixed delay, which may be zero.

The selectively delayed signals are provided by interpolating filters 20 to adaptive equalizer 22 via conductors 21A and 21B. In the preferred embodiment, adaptive equalizer 22 is a fractionally spaced adaptive equalizer. These selectively delayed signals are clocked into registers A1 and B1, then into registers A2 and B2, and then into registers A3 and B3. Therefore, registers A1 and B1 contain the current data, which represents mid-symbol data, and registers A3 and B3 contain the data from two sample points prior to the current sample point, which represents start-of-symbol data. The data from filter 20 is therefore decimated. When the sample signal on bus 44 occurs adaptive equalizer 22 uses the current sample, in registers A1 and B1, and the sample from two sample points earlier, in registers A3 and B3, to perform the adaptive equalization function. The output of adaptive equalizer 22 is provided via conductor 23 to the decision logic and other receiver functions 24 which process the equalized signal to recover the data, decode and/or descramble the data, provide the resulting information to an external device, such as a computer, etc. In the preferred embodiment, adaptive equalizer 22 uses two 49 bit registers, the outputs of each of which are multiplied by the appropriate complex filter coefficients and the products summed to obtain the appropriately equalized output signals. These complex filter coefficients are provided over bus 30 to filter control 27.

Filter control 27 inspects the filter coefficients provided by adaptive equalizer 22 to determine the location of the dominant tap on equalizer 22. Filter control 27 monitors the filter coefficients so as to determine whether the location of the dominant filter tap is stationary or is moving. In response to the location and movement of the dominant filter tap, filter control 27 adjusts the rate at which the selection signal on conductor 42 cycles through the bank of interpolating filters 20 so as to maintain the dominant filter tap in a stationary position and to prevent the dominant filter tap from going off the end of adaptive equalizer 22. Filter control 27 also provides baud status information on bus 44 to bit clock 45. Bit clock 45 provides a corrected bit clock signal or conductor 46 to the decision logic and other receiver functions 24. The bit clock signal on conductor 46 is responsive to the sample clock provided to converter 14, to a rollover condition in filters 20 and a speed selection signal provided by decision logic 24 over bus 47. A rollover condition is defined as the event wherein the particular interpolating filter selected changes from the first filter (minimum delay) to the last filter (maximum delay), or changes from the last filter to the first filter.

The frequency of the sample clock provided to converter 14, a submultiple of which represents the uncorrected receiver baud clock, is fixed and the difference between the remote device clock and the local device clock will eventually cause the local and remote baud clocks to be out of an acceptable degree of synchronization. The rollover condition indicates that the difference between the two baud clocks has reached one sample period and in order to compensate for this difference the baud clock and the bit clock should be adjusted, and the number of samples per local baud time should be changed so as to add or delete a sample. Filter control 27 therefore provides baud status information to bit clock 45. The baud status information causes bit clock 45 to momentarily change the frequency of the bit clock on conductor 46 so as to compensate for the additional or missing sample. Filter control 27 also adjusts the decimation rate so that an additional sample is used or a sample is discarded.

Filter control 27 includes a dominant filter tap locator 31, a preferred dominant tap locator 34, a summer 33, an integrator 37, a filter pointer 41, and a baud detector 43. In the preferred embodiment, interpolating filters 20 and filter control 27 are embodied in a microprocessor. The complex filter coefficients on bus 30 are inspected by dominant tap locator 31 to determine the location of the dominant filter tap of adaptive equalizer 22. This is accomplished by a sum-of-the-squares method wherein, for each complex pair of coefficients for a filter position, the coefficient values are squared and then summed so as to arrive at a magnitude for the filter coefficients for a particular filter tap location. The magnitude of the filter coefficients for each filter tap position is compared with the magnitude of every other filter tap position and the largest magnitude corresponds to the dominant filter tap. A bubble sort is used to determine the largest magnitude. The current dominant filter tap position is provided over conductor 32 to positive input of summer 33 and to preferred dominant tap locator 34.

Preferred dominant tap locator 34 inspects the past and current positions of the dominant tap and provides the location of the preferred dominant tap of adaptive equalizer 22. Preferred dominant tap locator 34 compares the magnitude of the current difference between the dominant tap location and the center tap reference location with the magnitude of the largest prior difference between the dominant tap location and the center tap reference location. If the magnitude of the current difference is less than the magnitude of the prior difference then the new preferred dominant tap location is determined by adding the prior difference to the prior preferred dominant tap location. If the magnitude of the current difference is greater than the magnitude of the prior difference then the current magnitude is stored and becomes the prior difference for future calculations, and the new preferred dominant tap location is determined by adding the current difference to the prior preferred dominant tap location. This operation is performed at the baud rate. The output of preferred dominant tap locator 34 is provided over conductor 35 to the negating input of summer 33.

The output of summer 33 is the difference between the current dominant tap location and the current preferred dominant tap location. The output of summer 33 is provided over conductor 36 to the input of a leaky integrator 37 which integrates the output of summer 33 and provides this integrated output, over conductor 40, to filter pointer 41. Filter pointer 41 determines a new filter pointer value by adding the current filter pointer value and the output of integrator 37. In the preferred embodiment, integrator 37 uses a 16 bit register and filter pointer 41 uses a 24 bit register. Therefore, it takes numerous summations of the output of integrator 37 to substantially affect the value contained in filter pointer 41. The five most significant bits of filter pointer 41 are provided to interpolating filters 20 to select the appropriate one of the 32 filters in interpolating filters 20.

The output of filter pointer 41 is also provided over conductor 42 to baud detector 43. Baud detector 43 is responsive to the sample clock provided to converter 14 and to a rollover condition of filter pointer 41. If the local clock is running faster than the remote clock then converter 14 will be providing samples at higher than the optimum rate. In order to compensate for this higher sample rate filter control 27 will be selecting filters, in interpolating filters 20, which have increasingly greater delays. Initially, with a speed selection of 9600 bps, baud detector 43 will provide a baud sample output on bus 44 on every fourth sample clock pulse provided to converter 14. However, at some point, filter pointer 41 will rollover (overflow from pointing at the 32nd filter to the first filter). This advises baud detector 43 that the sample clock frequency is too high and that one additional sample has been obtained. In order to correct for this additional sample baud detector 43 will provide the baud sample output on the fifth sample clock pulse, rather than on the fourth sample clock pulse, for the next baud, thereby skipping or discarding a sample. Thereafter, baud detector 43 will provide the baud sample output on the fourth sample clock pulse until such time as filter pointer 41 overflows again.

However, if the local clock is running at a lower frequency than the remote clock then filter pointer 41 will beginning pointing to filters, in interpolating filters 20, which have consecutively decreasing delays. At some point filter pointer 41 will underflow (change from pointing at the first filter to the 32nd filter). This means that a sample has been missed and, in order to compensate for the missed sample, baud detector 43 will provide the baud sample output on the third sample clock pulse, rather than the fourth sample clock pulse, for the next baud, thereby providing an additional sample.

The output of baud detector 43 is also provided over bus 44 to the bit clock circuit 45. The bit clock circuit 45 is responsive to the output of baud detector 43 and to the sample clock for providing a bit clock on conductor 46 to the decision logic and other receiver functions 24. If the local and remote clocks are operating at the same frequency then the bit clock would simply provide pulses at the data transfer rate (e.g., 9600 bps, 4800 bps, 2400 bps, etc.). However, if the local clock is faster than the remote clock then bit clock 45 will run fast and it will be necessary to periodically retard bit clock 45. In the preferred embodiment, baud detector 43 advises bit clock 45 whether a rollover or a normal condition exists for filter pointer 41. If a normal condition exists then no adjustment of the bit clock is necessary. However, if filter pointer 41 has overflowed then the local clock is running too fast and the bit clock must be retarded by one count. However, if filter pointer 41 underflows then the local clock is running too slow and the bit clock must be advanced by one count. In the preferred embodiment, bit clock 45 is a counter whose preset values are determined by the output of baud detector 43.

Figure 2:
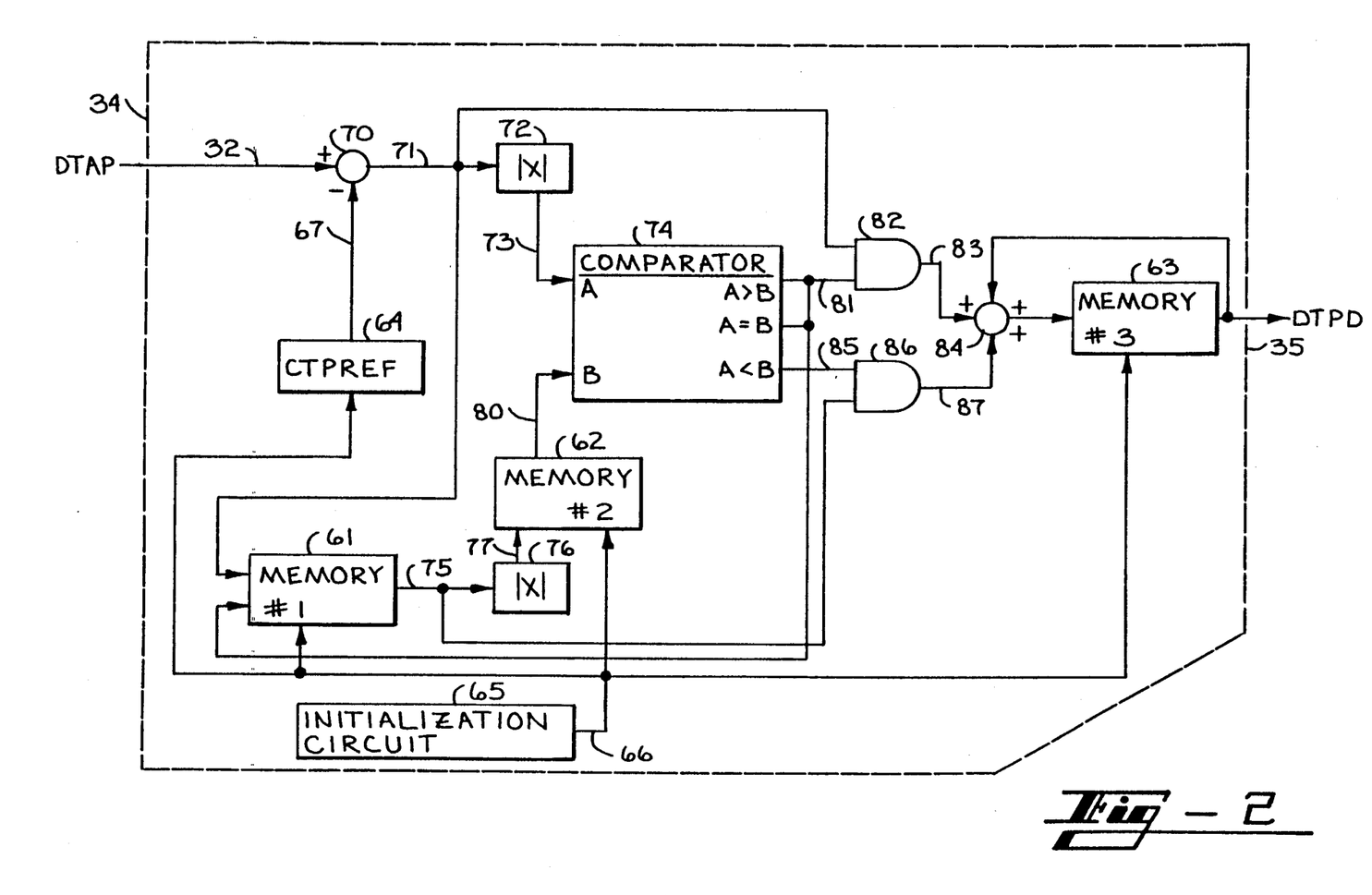
FIG. 2 is a diagram of the preferred dominant tap locator 34 of the present invention.

FIG. 2 is a diagram of the preferred dominant tap locator 34 of the present invention. A first memory 61 contains the prior largest difference between the dominant tap location (DTAP) and the center tap reference location (CTPREF). A second memory 62 contains the magnitude of the prior difference contained in memory 61. A third memory 63 contains the current value of the preferred dominant tap location. A fourth memory 64 contains the center tap reference location (CTPREF). Memories 61 through 64 are initialized by an initialization circuit 65 via conductor 66. In the preferred embodiment, adaptive equalizer 22 has 49 tap locations. Therefore, the center tap reference location (CTPREF) is the middle tap, which is tap number 25. Accordingly, memories 63 and 64 are initialized with the value of 25 and memories 61 and 62, which represent difference values, are initialized with the value of zero.

The dominant tap location (DTAP) is provided over conductor 32 to the positive input of summer 70. The output of memory 64 (CTPREF) is connected by conductor 67 to the negative input of summer 70. The output of summer 70, which is the difference between DTAP and CTPREF, is provided over conductor 71 to the input of memory 61, magnitude circuit 72, and a symbolic AND gate 82. The output of magnitude circuit 72 is the magnitude of the difference between the DTAP signal and the CTPREF signal and is provided over conductor 73 to the A input of comparator 74. The output of memory 61 is provided over conductor 75 to the input of magnitude circuit 76 and one input of symbolic AND gate 86. Symbolic gates 82 and 86 are used to indicate that only one of the current difference on conductor 71 and the stored difference on conductor 75 are provided to summer 84. The output of magnitude circuit 76 is provided on conductor 77 to memory 62. The output of memory 62 is provided on conductor 80 to the B input of comparator 74. Comparator 74 compares the A input to the B input. In the preferred embodiment the "A>B" and "A=B" outputs of comparator 74 are connected by conductor 81 to the other input of gate 82 and to the control input of memory 61. Also, the "A<B" output of comparator 74 is connected by conductor 85 to the other input of gate 86. In the preferred embodiment, if the A input is greater than or equal to the B input then the outputs of comparator 74 on conductor 81 enable gate 82. However, if the A input is less than the B input then the output of comparator 74 on conductor 85 enables gate 86. The output of gates 82 and 86 and the output of memory 63 are provided to positive inputs of summer 84 over conductors 83, 87, and 35, respectively.

If the A input of comparator 74 is greater than or equal to the B input then gate 82 will pass, to summer 84, the difference between the current DTAP signal and the CTPREF reference signal. Summer 84 will add this current difference to the previous value for the preferred dominant tap location (DTPD) and this new value will be stored in memory 63 as the new value for the DTPD signal on conductor 35. Also, the signal on conductor 81 will cause memory 61 to store the current difference between the DTAP signal and the CTPREF signal so that memory 61 always contains the largest difference between these two signals. However, if the A input of comparator 74 is less than the B input then gate 86 will provide the stored difference value, contained in memory 61, to summer 84. Summer 84 will then provide the new value for the DTPD signal by summing the stored difference with the stored value of DTPD in memory 63. Also, memory 61 will retain its stored value and will not be updated. In the preferred embodiment, the values for the DTAP signal and the DTPD signal are updated at the baud rate.

In an alternative embodiment, only the "A>B" output of comparator 74 is connected to conductor 81, and the "A=B" and "A<B" outputs are connected to conductor 85. In this alternative embodiment gate 82 will be enabled and memory 61 will be updated only if the magnitude of the current difference is greater than the magnitude of the stored difference.

Figure 3:
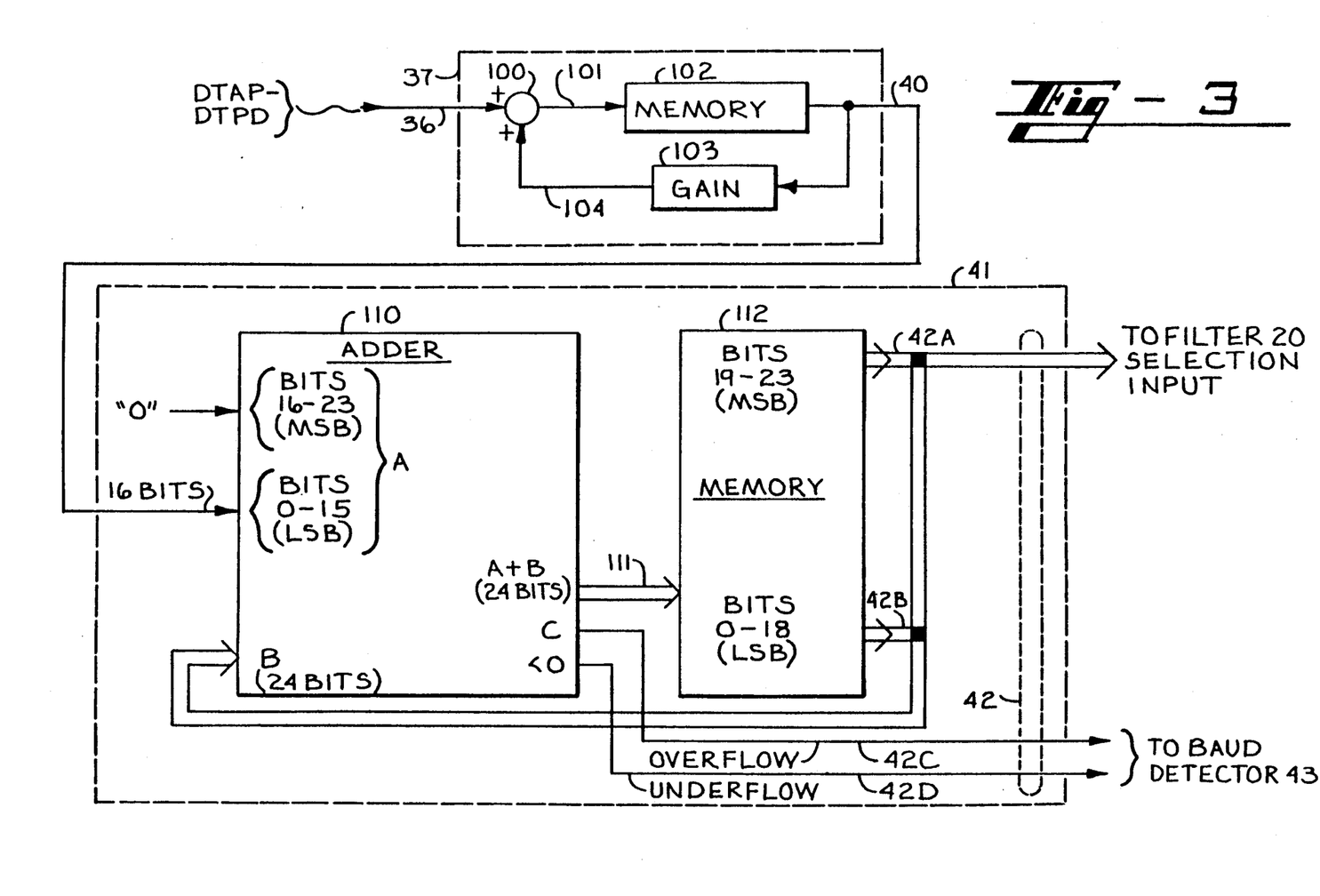
FIG. 3 is a diagram of the integrator and filter pointer.

FIG. 3 is a diagram of the integrator 37 and filter pointer 41. The difference signal (DTAP−DTPD) on conductor 36 is applied to a positive input of summer 100. The output of summer 100 is provided by conductor 101 to the input of a storage device, such as memory 102, which stores the output of summer 100 to provide the integrated signal. The output of memory 102 on conductor 40 is provided to gain control 103 and to adder 110 of filter pointer 41. The output of gain control 103, an amplified integrated signal, is provided by conductor 104 to another positive input of summer 100. In the preferred embodiment, the gain of gain control 103 is 0.9961, which causes integrator 37 to have losses. Integrator 37 is therefore classified as a leaky integrator. Although the gain for component 103 is not extremely critical it will be appreciated that if the gain is too high then it will be difficult to obtain fine control of the baud timing and therefore baud timing jitter will occur. If the gain is too low then it will take an excessively long time to synchronize or resynchronize the local baud timing to the remote baud timing. In the preferred embodiment, the value in memory 102 is updated at the baud rate by storing the output of summer 100 in memory 102.

Filter pointer 41 contains a 24 bit adder 110 and a 24 bit memory 112. Memory 102 of integrator 37 is a 16 bit memory and provides the integrated signal over conductor 40 to the least significant 16 bits of input A of adder 110. A logic 0 is provided to the 8 most significant bits of input A of adder 110. The 24 bit A+B output of adder 110 is provided over conductor 111 to the input of a 24 bit memory 112. The 24 bit output of memory 112 is provided over busses 42A and 42B to the 24 bit B input of adder 110. Therefore, the current value in memory 112 is the sum of the previous output of memory 102 and the previous output of memory 112. In the preferred embodiment, memory 112 is updated every baud time. Only the five most significant bits of memory 112 are provided to the SELECTION input of interpolating filters 20 over bus 42A. The use of 16 bits for the output for integrator 37, 24 bits for memory 112, and the five most significant bits of memory 112 for the SELECTION signal provides an acceptable tradeoff between the conflicting requirements of fine control of the baud timing and rapid synchronization of the baud timing. It will be appreciated that it will take several updates of memory 112 in order for the output of integrator 37 to cause a change in the five most significant bits of memory 112. However, a maximum value output from integrator 37 will begin affecting the five most significant bits of memory 112 within eight updates of memory 112.

If the contents of memory 112, when added to the output of integrator 37, cause an overflow condition then adder 110 will signal the overflow condition via its carry (C) output on conductor 42C. Likewise, if an underflow condition occurs then adder 110 will signal the underflow condition by its negative (<0) output on conductor 42D. The overflow output and the underflow output are provided by conductors 42C and 42D, respectively, to baud detector 43. The operating state of filter pointer 27 therefore includes normal, overflow, and underflow conditions. It will be recalled from the above discussions that an overflow condition or an underflow condition indicates that the baud timing and the bit clock should be adjusted.

Figure 4A:
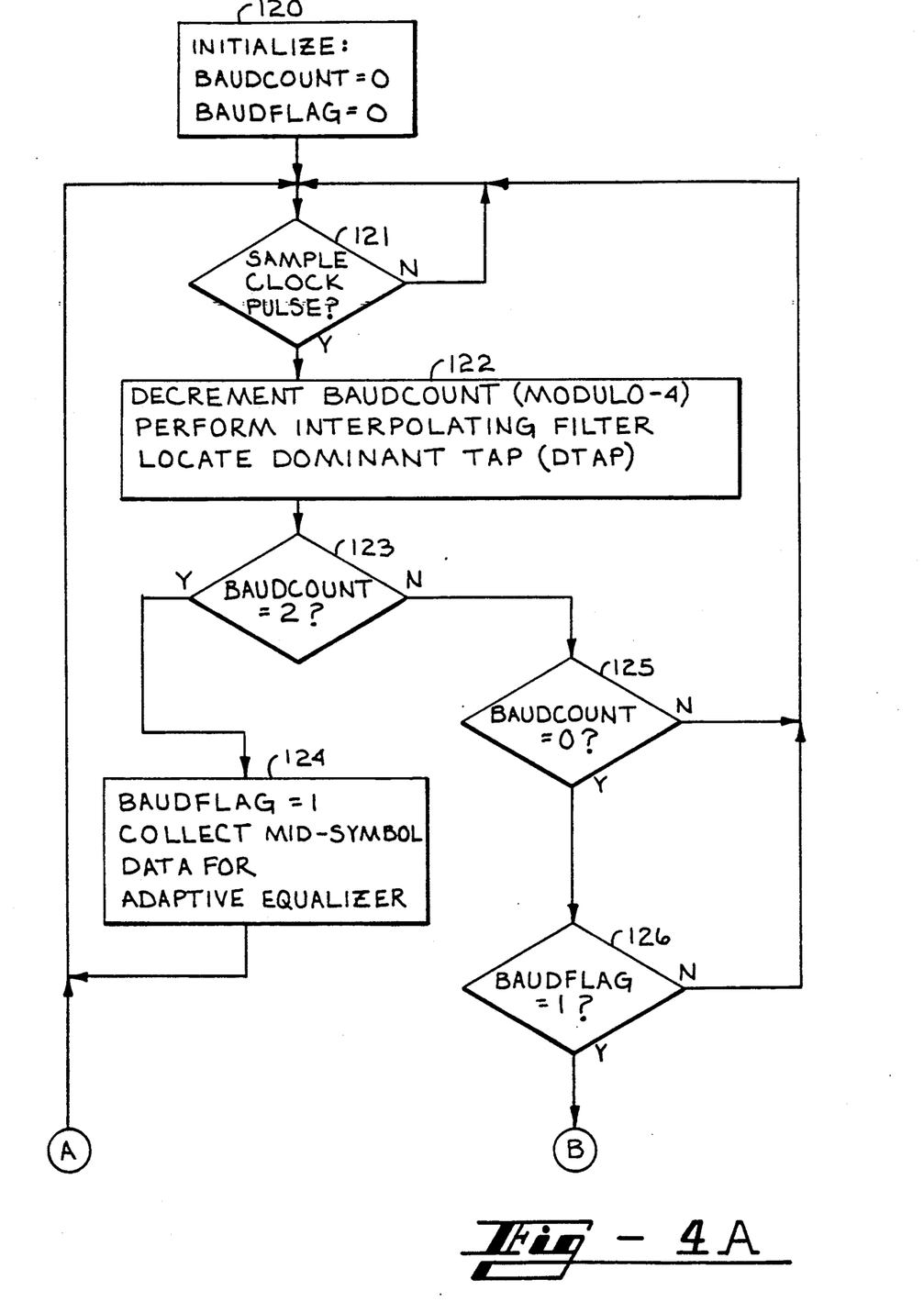
FIG. 4 is a flow chart which illustrates the functions performed by the interpolating filters and the filter control.
Figure 4B:
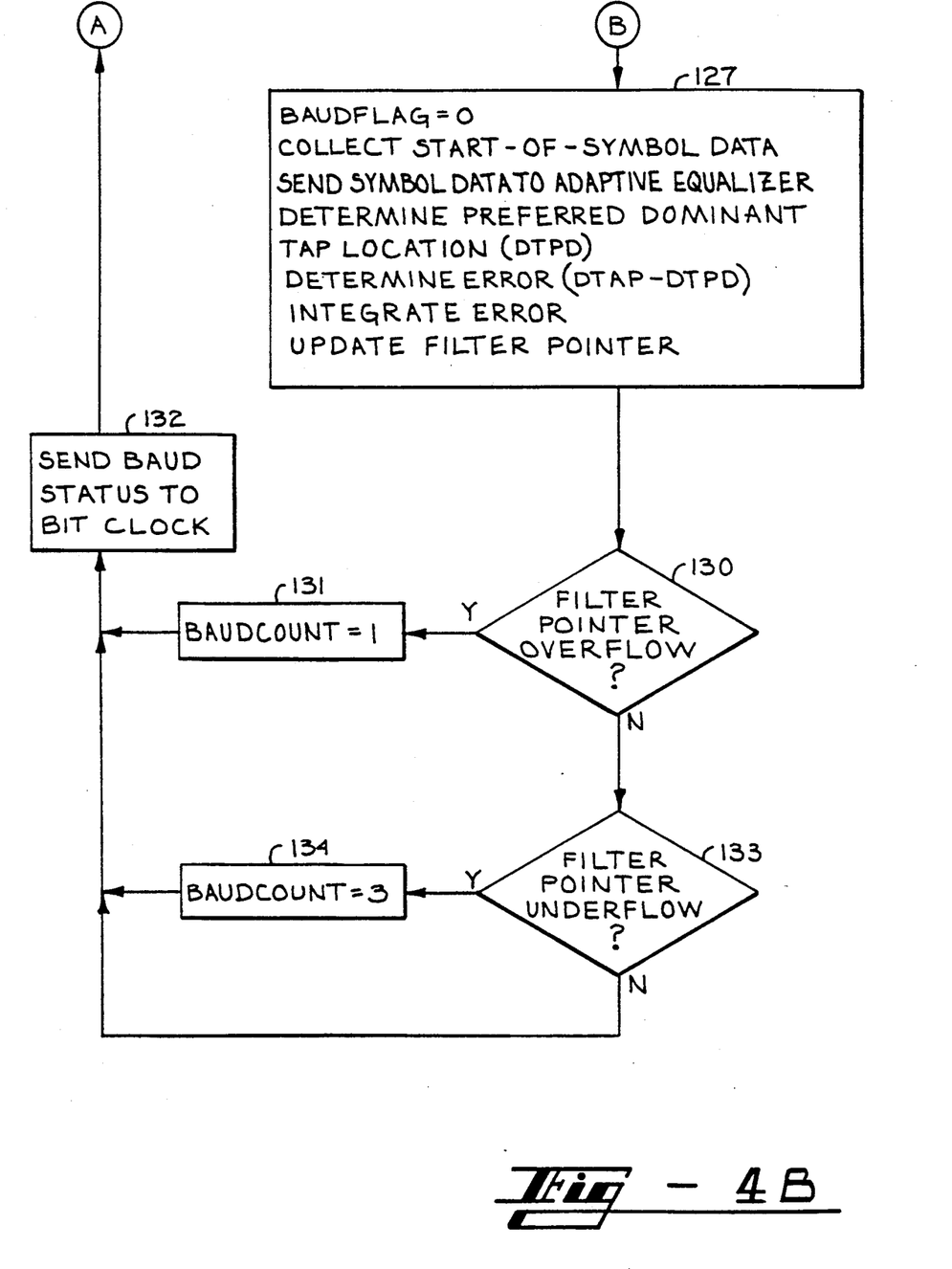

FIG. 4 is a flow chart which illustrates the functions performed by interpolating filters 20 and filter control 27. In step 120 the baudcount and the baudflag are initialized to the value of zero. Decision 121 simply indicates that the remaining steps are performed after each occurrence of the sample clock pulse. In step 122 the baudcount is decremented, the interpolating filter function is performed, and the dominant tap is located. In the preferred embodiment, the baud count is stored in a modulo 4 counter. This counter has three counting patterns: 3, 2, 1, 0 (filter pointer underflow); 1, 0, 3, 2, 1, 0 (filter pointer overflow); and 0, 3, 2, 1, 0 (normal). Decision 123 tests whether the baudcount is equal to 2. If so then, the baudflag is set to 1 and the mid-symbol data is collected for use by the adaptive equalizer. The device then returns to decision 121 and waits for the next sample clock pulse.

If the baud count is not equal to 2 then decision 125 tests whether the baud count is equal to 0. If not then the device returns to decision 121. If the baudcount is equal to 0 then decision 126 tests whether the baudflag is equal to 1. If not the device returns to decision 121. If the baudflag is equal to 1 then the device is at the end of a baud and therefore, in step 127, the baudflag is set to 0, the start-of-symbol data is collected for use by the adaptive equalizer, the symbol data (both mid-symbol and start-of-symbol) is sent to the adaptive equalizer, the location of the preferred dominant tap (DTPD) is determined, the error (DTAP−DTPD) is determined, the error is integrated, and the filter pointer is updated. Decision 130 then tests whether a filter pointer overflow has occurred. This test is performed by inspecting overflow conductor 44C for a logic 1. If an overflow has occurred then, in step 131, the baud count is set to 1 and, in step 132, the baud status (overflow) is sent to the bit clock circuit 45. On each pass through step 132 a signal, "WRITE1", is sent to bit clock circuit 45 to indicate that a new baud status is being provided. The WRITE1 signal occurs at the baud rate and is therefore a baud clock. The device then returns to decision 121. If the filter pointer has not overflowed then decision 133 tests whether the filter pointer has underflowed. This test is performed by inspecting the underflow condition conductor 44D for the presence of a logic 1. If an underflow has occurred then, in step 134, the baudcount is set equal to 3, and, in step 132, the baud status (underflow) is sent to the bit clock. The device then returns to decision 121. If neither a filter pointer overflow nor a filter pointer underflow has occurred (normal operation) then, in step 132, the baud status (normal) is sent to the bit clock. It will be appreciated that the baud status reflects the operating state (normal, overflow and underflow condition) of filter pointer 27. The device then returns to decision 121.

It will be recalled that if the baud clock in the local device runs at a faster rate then the baud clock in the remote device then interpolating filters 20 will be required to provide increasingly greater delays until the maximum delay point is reached and the filter pointer rolls over (overflows) and resets to the first filter, which provides the least delay. When this occurs the device has accumulated one additional sample and, to resync the sampling clock, the device counts five sample clock pulses, rather than four sample clock pulses, to determine that the next baud time has occurred. This extra count is provided by loading the baud counter with a value of 1. The baud counter will therefore start with a value of 1 and, on each pass through step 122, will be decremented so that the values in the baud counter will be, after step 122 is performed, 0, 3, 2, 1, 0. It will be noted that, normally, a baudcount value of 0 signals the end of a baud. However, when a filter pointer overflow condition has occurred, the baudcount will reach the value of 0 twice, the second time signifying the end of the baud. In order to prevent the first occurrence of the value of 0 from erroneously signaling the end of a baud, a baud flag is used to indicate whether the value of 0 does properly indicate the end of a baud. It will be noted that the baudflag is set in step 124 when the baudcount reaches 2, and is reset in step 127 at the end of the baud. Therefore, if a filter pointer overflow condition occurs and the baud counter is decremented from 1 to 0, the baudflag will still be in the reset state since a baudcount of 2 has not occurred. Therefore, in decision 126 the baudflag will have the value of 0 and the device will return to decision 121. After decrementing the baud count two more times the baudcount will be 2 and decision 123 and step 124 will cause the baudflag to be set so that, after two more decrements, the baudcount will reach 0 and properly indicate the end of a baud.

If the local baud clock is running slower than the remote baud clock then the filter pointer will cause interpolating filters 20 to provide successively decreasing delays. At some point the filter pointer will underflow (change from pointing to the filter with the least delay to pointing to the filter with the most delay), which indicates that a sample has been missed and an extra sample should be obtained. This extra sample is obtained by setting the baud count equal to 3 in step 134 so that only three occurrences of the sample clock pulse will cause the baudcount to be 0 and indicate the end of a baud.

Between overflow events, and between underflow events, the baud counter does not need to be corrected. Therefore, in normal operation, the baud counter simply underflows on every fourth pass through step 122.

The use of a baudflag is a result of the use of a modulo 4 counter for the baud counter. If a higher modulus is used, such as 8, then the baudflag could be omitted, decision 125 would flow directly into step 127, and, in step 131, the baudcount will be set equal to 5. However, in this event, the negative output of decision 133 would be required to flow into a step which set the baudcount to 4 so that, in normal operation, every fourth sample clock pulse would indicate the end of a baud.

Figure 5A:
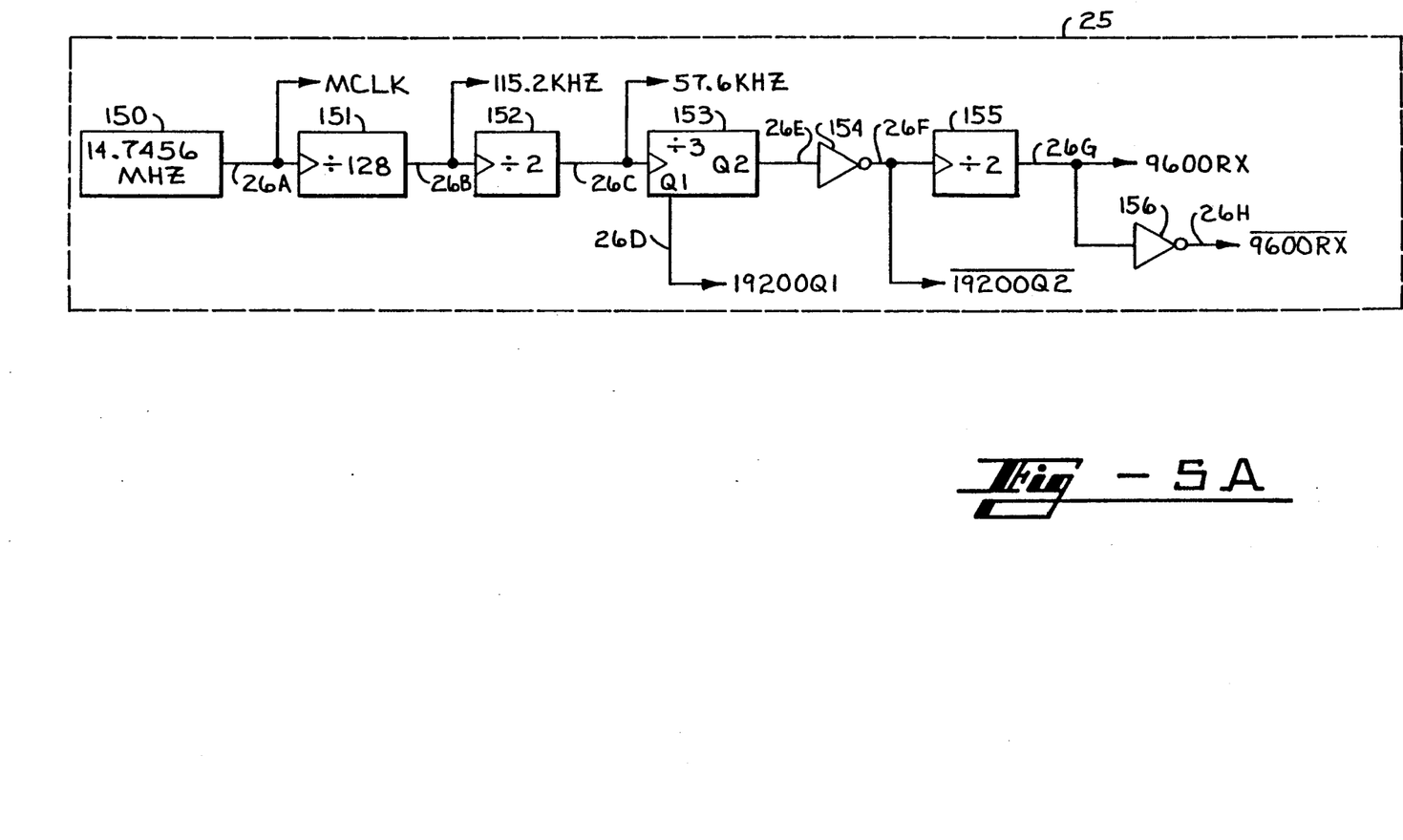
FIG. 5 is a diagram of the bit clock circuit and the relevant part of the master clock circuit.
Figure 5B:
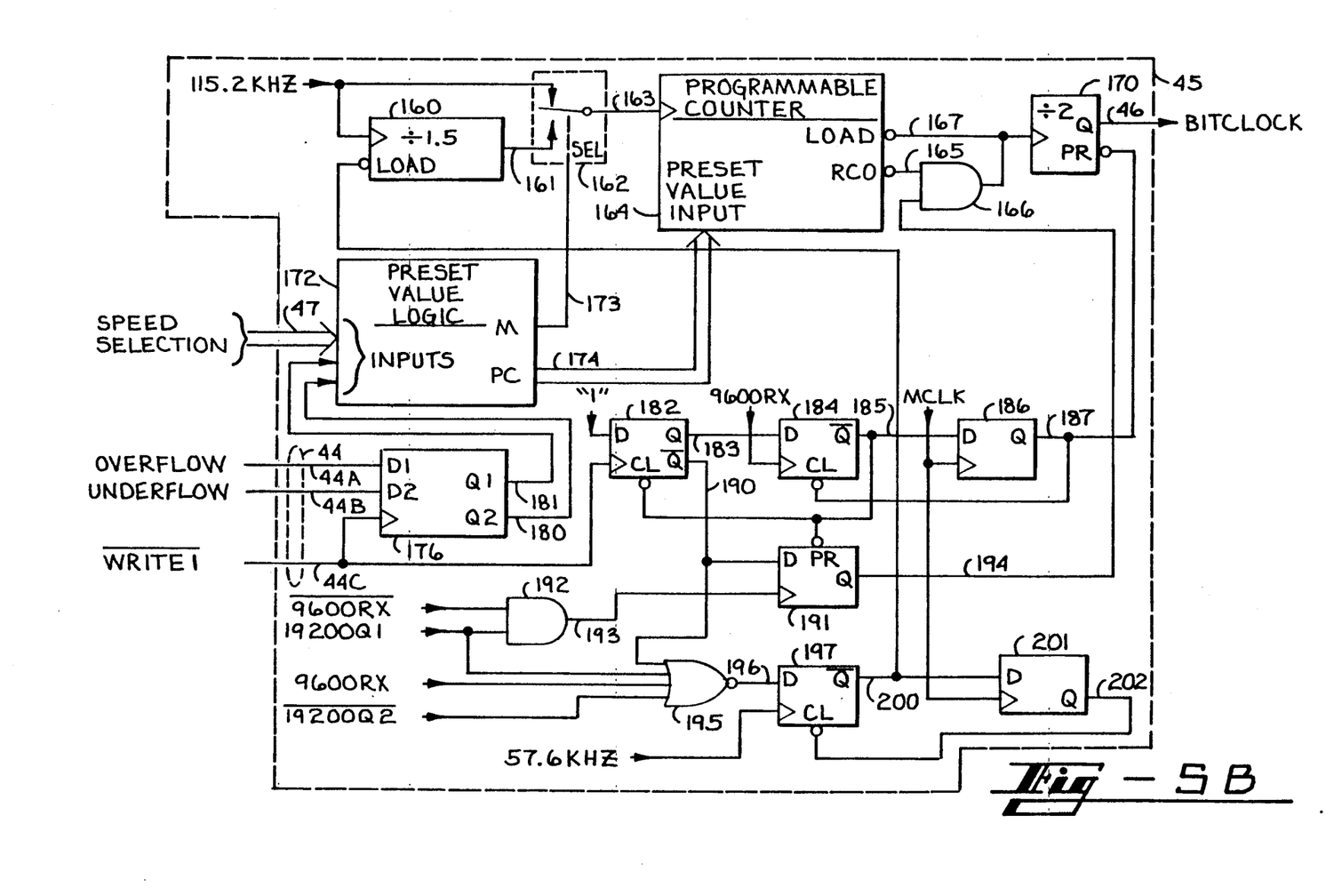

FIG. 5 is a diagram of the bit clock circuit 45 and the relevant part of the master clock circuit 25. It will be recalled that the sample clock frequency is fixed and that, at a data rate of 9600 bps, there may be N−1, N, or N+1 samples taken per baud before decimation and so the local baud timing is variable. However, the bit clock needs to provide exactly the same number of bit clock pulses per baud. Therefore, the bit clock frequency must also be variable in order to track the local baud timing. In the preferred embodiment, the bit clock frequency is increased by approximately 33 percent for 14,400, 9600, 7200 and 4800 bps (nominal), and approximately seven percent for 2400, 1200 and 600 bps (nominal) for the compressed mode of operation, and is decreased by approximately 20 percent and six percent, respectively, for the expanded mode of operation. Furthermore, in order to maintain the integrity of the outgoing data, the bit clock frequency is fixed within a baud and can only change values on a baud-by-baud basis. The circuit of FIG. 5 therefore provides a variable frequency bit clock and synchronizes any changes in the bit clock frequency to the beginning of a baud. A 14.7456 megaHertz oscillator 150 provides the master clock (MCLK) signal on conductor 26A to a divide-by-128 divider 151. The 115.2 kHz output of divider 128 is provided on conductor 26B to a divide-by-2 divider 152. The 57.6 kHz output of divider 152 is provided on conductor 26C to a divide-by-3 divider 153. The Q1 output of divider 153 is provided as the 19200Q1 signal on conductor 26D. The Q2 output of divider 153 is provided on conductor 26E to the input of inverter 154. The output of inverter 154 is provided on conductor 26F as a negated 19200Q2 signal to the input of a divide-by-2 divider 155. The output of divider 155 is the 9600RX signal on conductor 26G and is provided to the inverter 156. The output of inverter 156 on conductor 26H is the negated 9600RX signal. Outputs Q1 and Q2 of divider 153 are 19200 kHz clocks which have a duty cycle of 33 percent. The Q1 output leads the Q2 output by one third of a cycle. The several clock signals provided by clock circuit 25 are provided to bit clock circuit 45. It will be understood that clock circuit 25 also provides clocks having other frequencies to transmitter 11 and to other components in the receiver section as shown in FIG. 1. The 9600RX signal has a frequency of 9600 Hertz and is the sample clock provided to A/D convertor 14. It will therefore be seen that the sampling frequency is fixed.

The 115.2 kHz signal is provided to the clock input of a divide-by-1.5 divider 160 and to one contact of a single pole, double throw switch (or multiplexer) 162. The output of divider 160 is provided to the other contact of switch 162. Switch 162 selects the 115.2 kHz signal when the nominal bit rate is 14,400 bps, 7200 bps, or 4800 bps. The 76.8 kHz output of divider 160 is selected when the nominal bit rate is 9600 bps, 2400 bps, 1200 bps, or 600 bps. The output of switch 162 is provided over conductor 163 to the clock input of a programmable counter 164. The negated ripple carry output (RCO) of counter 164 is connected by conductor 165 to one input of a two-input AND gate 166. The output of gate 166 is provided on conductor 167 to the clock input of a divide-by-2 divider 170 and to the negated LOAD input of counter 164. The Q output of divider 170 is the bit clock on conductor 46. Table 1 shows the bit clock frequencies for the normal, compressed and expanded modes of operation.

TABLE 1

| Bit Clock Frequencies | | |
|---|---|---|
| Normal | Compressed | Expanded |
| 14400 | 19200 | 11520 |
| 9600 | 12800 7680 | |
| 7200 | 9600 | 5760 |
| 4800 | 6400 | 3840 |
| 2400 | 2560 | 2259 |
| 1200 | 1280 | 1129 |
| 600 | 640 | 565 |

Table 2 shows the divider factors for programmable counter 164 and the use/non-use of divider 160 for the different bit clock frequencies.

TABLE 2

| | Divider Factors | |
|---|---|---|
| Frequency | Divide by 1.5 | Programmable Counter |
| 19200 | No | 3 |
| 14400 | No | 4 |
| 11520 | No | 5 |
| 12800 | Yes | 3 |
| 9600 | Yes | 4 |
| 7680 | Yes | 5 |
| 9600 | No | 6 |
| 7200 | No | 8 |
| 5760 | No | 10 |
| 6400 | No | 9 |
| 4800 | No | 12 |
| 3840 | No | 15 |
| 2560 | Yes | 15 |
| 2400 | Yes | 16 |
| 2259 | Yes | 17 |
| 1280 | Yes | 30 |
| 1200 | Yes | 32 |
| 1129 | Yes | 34 |
| 640 | Yes | 60 |
| 600 | Yes | 64 |
| 565 | Yes | 68 |

The speed selection output of decision logic 24 is provided over bus 47 to the inputs of preset value logic circuit 172. The speed selection is usually fixed for a particular communication. Preset value logic circuit 172 provides a first output (M) on conductor 173 to the selection (SEL) input of switch 162, and a second output (PC) on bus 174 to the preset value input of programmable counter 164. Preset value logic circuit 172 therefore selects whether divider 160 is or is not used and loads the proper preset value into programmable counter 164 so that programmable counter 164 will provide the divider factors indicated in Table 2. The overflow signal and the underflow signal are provided over conductors 44A and 44B, respectively, to the D1 and D2 inputs, respectively, of register 176. The Q1 and Q2 outputs of register 176 are provided over conductors 181 and 180, respectively, to the inputs of preset value logic circuit 172. The speed selection on bus 47 selects the normal (nominal) bit clock frequency and, if appropriate, the overflow and underflow signals on conductors 44A and 44B, respectively, select the expanded mode or the compressed mode, respectively, for the bit clock frequecy Filter control 27 provides the overflow, underflow and negated WRITE1 signals to bit clock circuit 45 at the end of each baud count (step 132 of FIG. 4). The negated WRITE1 signal is provided on conductor 44C to the clock input of register 176 and the clock input of register 182. The data (D) input of register 182 is connected to a logic 1. Therefore, on the rising edge of the negated WRITE1 signal the new normal/overflow/underflow baud status is clocked into register 176 and a logic 1 is clocked into register 182. Registers 184, 186, 191, 197, and 201 synchronize the loading of divider 160, programmable divider 164, and divider 170.

The Q output of register 182 is connected by conductor 183 to the D input of register 184. The 9600RX clock is connected to the clock input of register 184. The negated Q output of register 184 is connected by conductor 185 to the negated clear (CL) input of register 182, the negated preset (PR) input of register 191, and the D input of register 186. The MCLK clock is provided to the clock input of register 186. The Q output of register 186 is provided on conductor 187 to the negated preset input of register 170 and the negated clear input of register 184. The signal on conductor 187 forces the bit clock on conductor 46 to a logic 1 on the next rising edge of the 9600RX signal after a negated WRITE1 pulse occurs. The start of a baud time is therefore signalled by the first rising edge of the bit clock signal on conductor 46 after a negated WRITE1 pulse occurs. The negated Q output of register 182 on conductor 190 is provided to the D input of register 191 and one input of a 4-input NOR gate 195. The negated 9600RX signal is connected to one input of a two-input AND gate 192. The 19200Q1 signal is provided to the other input of gate 192 and to a second input of gate 195. The output of gate 192 is provided on conductor 193 to the clock input of register 191. The Q output of register 191 is provided on conductor 194 to the other input of gate 166. A logic 0 on conductor 194 disables gate 166 and programmable counter 164, causes counter 164 to be loaded with a new value on the next rising edge of the clock signal on conductor 163, forces the negated RCO signal on conductor 165 to a logic 1, and prevents the bit clock signal on conductor 46 (which is a logic 0 at that time) from being prematurely forced to a logic 1 state by counter 164. The rising edge of the 9600RX signal will, through registers 184 and 186, cause the bit clock signal on conductor 46 to be preset to a logic 1 at the beginning of the next cycle.

The 9600RX signal and the negated 19200Q2 signal are connected to the other two inputs of gate 195. The output of gate 195 is connected by conductor 196 to the D input of register 197. The 57.6 kHz signal is connected to the clock input of register 197. The negated Q output of register 197 is connected by conductor 200 to the negated LOAD input of divider 160 and the D input of register 201. The MCLK signal is connected to the clock input of register 201. The Q output of register 201 is connected by conductor 202 to the negated clear input of register 197. The signal on conductor 200 is used to force divider 160 to load (reset) just prior to the first rising edge of the 9600RX signal after a negated WRITE1 pulse.

Figure 6:
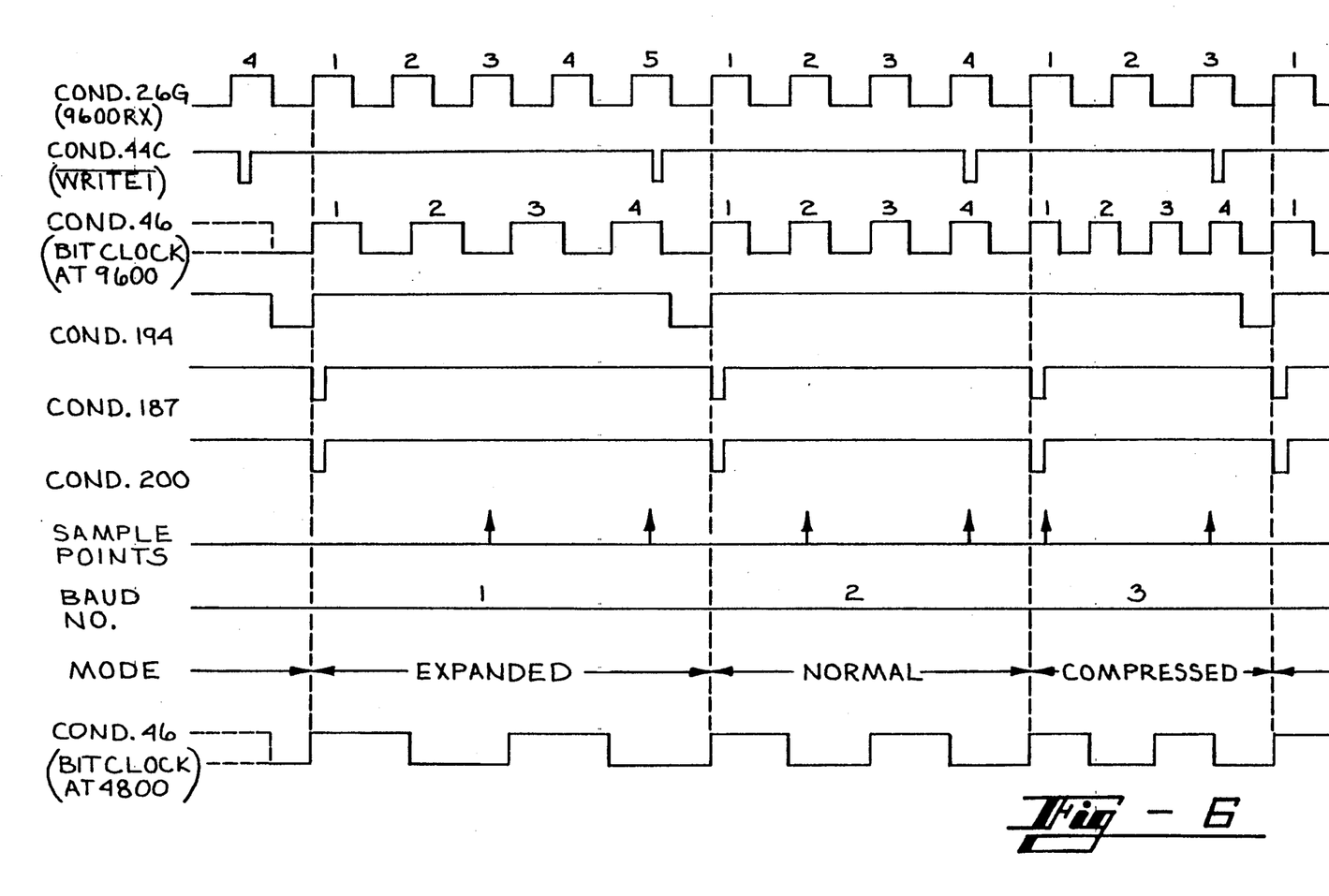
FIG. 6 is a timing diagram for the signals used to generate the bit clock.

FIG. 6 is a timing diagram for the signals used to generate the bit clock. The 9600RX signal on conductor 26G has a fixed frequency of 9600 Hertz. The negated WRITE1 pulse on conductor 44C preferably occurs when the 9600RX signal is a logic 1. The occurrence of the negated WRITE1 pulse indicates that the end of a baud is near and that the next rising edge on the 9600RX signal is the start of a new baud. It will be seen that there may be five, four, or three cycles for the 9600RX signal, depending upon whether the expanded, normal, or compressed mode, respectively, is selected. However, it should be noticed that the bit clock on conductor 46, when a nominal speed of 9600 bps has been selected, always has four cycles per baud. Therefore, the bit clock frequency is adjusted so as to provide the proper number of bit clock pulses during a baud time, regardless of whether that baud time is equal to three, four or five clock cycles at 9600 Hertz. A baud clock signal can be provided, if desired, by simply dividing the bit clock on conductor 46 by the appropriate number. For example, for 9600 bps and 4800 bps the appropriate integer is 4 and 2, respectively. A baud clock signal can also be provided by setting a latch on rising edges of the 9600RX clock and resetting the latch on the negated WRITE1 pulse.

It will be noticed that the negated WRITE1 pulse causes signals to occur on conductors 194, 187, and 200. As previously stated, the logic 0 on conductor 194 disables gate 166 of FIG. 5 and maintains divider 170 in a logic 0 state until the next rising edge of the 9600RX signal. The signal on conductor 187, which forces the bit clock signal to a logic 1, occurs on the rising edge of the 9600RX signal. The signal on conductor 200, which causes a load (reset) of divider 160, also occurs on the rising edge of the 9600RX signal immediately following the negated WRITE1 pulse. Because of the reset action provided by registers 186 and 201 of FIG. 5 the logic 0 pulses on conductors 187 and 200 are very narrow, and have a period equal to the period of the master clock. Also, the logic 0 pulse for the negated WRITE1 signal is very narrow, typically being the execution time for one instruction for the processor implementing filter control 27. The bit clock on conductor 46, at a speed of 4800 bps, provides exactly two cycles per baud, regardless of whether normal, compressed or expanded mode is selected. At 2400, 1200, and 600 bps, the bit clock on conductor 46 provides four, two, and one, respectively, cycles per baud. FIG. 6 also shows that, in the expanded mode, samples are provided to the adaptive equalizer on the third and fifth sample clock pulses. In the normal mode of operation, samples are provided to the adaptive equalizer on a second and fourth sample clock pulses. In the compressed mode of operation, samples are provided to the adaptive equalizer on the first and third sample clock pulses. The signals associated with baud number 2 illustrate the normal mode of operation wherein there are four samples per baud and every other sample is provided to the adaptive equalizer. Baud number 1, which illustrates the expanded mode of operation, has five samples per baud. Using every other sample is considered to be normal operation so it would seem that sample number 1 should also be used. However, in the expanded mode of operation, the baud detector and bit clock circuits are compensating for the fact that the sample clock is running too fast for the remote transmitter clocks and therefore a sample (the sample taken at cycle number 1) is not used and is considered to be discarded.

The compressed mode of operation has three samples per baud. Again, considering the use of every other sample to be normal operation, it will be seen that both samples 4 of the preceding baud (baud number 2) and sample number 1 of current baud (baud number 3) are used. Therefore, the baud detector and bit clock circuits are compensating for the slow running data sampling clock by adding a sample, e.g., shifting the sampling, from samples 2 and what would be sample number 4 of baud 3, to use samples 1 and 3 of baud 3.

FIGS. 1 and 4 describe two different techniques, which accomplish the same results, for providing samples to adaptive equalizer 22. FIG. 1 indicates that the sample signal on conductor 44 instructs adaptive equalizer 22 to use the current sample (A1, B1) and the sample from two sample times before (A3, B3). FIG. 4 indicates, in step 124, that mid-symbol data is collected for the adaptive equalizer and, in step 127, start-of-symbol data is collected for the adaptive equalizer and the full symbol data is then sent to the adaptive equalizer. It will be appreciated that both techniques accomplish the same results: decimating the sampled signal and causing adaptive equalizer 22 to use the current sample and the sample from two samples before. In the preferred embodiment, the technique illustrated by FIG. 4 is used.

It will be appreciated from the above that the present invention encompasses the use of a fixed sample clock, interpolating filters to compensate for differences between the local and remote clocks, an adaptive equalizer, a filter control which monitors the location and any movement of the dominant tap in the adaptive equalizer, adjusts the cycle rate through the interpolating filters to prevent movement of the dominant tap, and adds or discards a sample, if and when appropriate, so as to provide the proper number of samples per baud to the adaptive equalizer, a baud detector for detecting the end of a baud, and a bit clock circuit for providing a local bit clock. From the above description and drawings, many other embodiments of the present invention may suggest themselves to those skilled in the art. Therefore, the invention is to be limited only by the claims below.

What is claimed is:

1. For use with a data communications receiver comprising an analog-to-digital converter responsive to a sample clock signal having a fixed frequency for sampling a received signal to provide a sampled received signal, a data demodulator responsive to said sampled received signal for providing a received baseband data signal, and an adaptive equalizer for providing a set of complex adaptive equalizer filter coefficients in response to an interpolated data signal, said received signal having a remote baud timing established by a remote transmitter, said received baseband data signal having a local baud timing established by said data communications receiver, an improved baud timing recovery circuit for synchronizing said local baud timing to said remote baud timing, comprising:

interpolating filter means responsive to said received baseband data signal and a filter selection signal for providing said interpolated data signal to said adaptive equalizer;

dominant tap locator means responsive to said set of complex adaptive equalizer filter coefficients from said adaptive equalizer for providing a dominant filter tap position signal;

preferred dominant tap locator means responsive to said dominant filter tap position signal for providing a preferred dominant tap location signal;

summing means responsive to said dominant filter tap position signal and said preferred dominant tap location signal for providing a difference signal;

integrator means responsive to said difference signal for providing an integrated signal; and filter control means responsive to said integrated signal and to said sample clock signal for providing said local baud timing and for providing said filter selection signal.

2. A data communications receiver as recited in claim 1 wherein said interpolating filter means comprises:
a plurality of filters responsive to said filter selection signal for providing said interpolated data signal by selectively delaying said received baseband data signal.

3. A data communications receiver as recited in claim 2 wherein said plurality of filters provides a plurality of distinct delays.

4. A data communications receiver as recited in claim 3 wherein each filter of said plurality of filters is a finite impulse response filter.

5. A data communications receiver as recited in claim 1 wherein:
said dominant filter tap means provides said dominant filter tap position signal by determining which pair of complex adaptive equalizer filter coefficients has a squared magnitude greater than a squared magnitude of any other pair of said complex adaptive equalizer filter coefficients.

6. A data communications receiver as recited in claim 1 wherein said means for providing said preferred dominant tap location signal comprises:
means responsive to a difference between said dominant filter tap position signal and a center tap reference signal for providing an error signal;
first storage means responsive to said error signal and said preferred dominant tap location signal for providing a stored error signal and a stored preferred dominant tap location signal, respectively;
means for calculating a magnitude for said error signal and a magnitude for said stored error signal;
second storage means responsive to said magnitude of said error signal for providing a stored magnitude of said error signal; and
means responsive to said magnitude of said error signal being greater than said stored magnitude of said error signal for providing said preferred dominant tap location signal by summing said error signal and said stored center tap reference adjustment signal and for updating said stored error signal by equating said stored error signal to said error signal, and responsive to said magnitude of said error signal being less than said stored magnitude of said error signal for providing said preferred dominant tap location signal by summing said stored error signal and said stored preferred dominant tap location signal.

7. A data communications receiver as recited in claim 1 wherein said summing means comprises:
algebraic summing junction responsive to an algebraic difference between said dominant filter tap position signal and said preferred dominant tap location signal for providing said difference signal.

8. A data communications receiver as recited in claim 1 wherein said integrator means comprises:
summing means responsive to a summation of said difference signal and an amplified integrated signal for providing a sum signal;
storage means for storing said sum signal to provide said integrated signal; and
gain means with a predetermined gain for providing said amplified integrated signal in response to said integrated signal.

9. A data communications receiver as recited in claim 8 wherein:
said predetermined gain is approximately 0.9961.

10. A data communications receiver as recited in claim 1 wherein said filter control means comprises:
summing means for providing a counter signal by summing said integrated signal and a stored counter signal;
storage means for providing said stored counter signal by storing said counter signal; and
truncation means for providing said filter selection signal by using a predetermined number of higher order bits of said stored counter signal.

11. A data communications receiver as recited in claim 10 wherein:
said storage means is 24 bits in length.

12. A data communications receiver as recited in claim 10 wherein:
said predetermined number of higher order bits is 5.

13. A data communications receiver as recited in claim 10 and further comprising:
baud detector means responsive to said sample clock signal and an operating state of said filter control means for providing said local baud timing and for causing said interpolated data signal at a current sample point and two sample points prior to said current sample point to be used by said adaptive equalizer, said operating state comprising normal, overflow, and underflow conditions.

14. A data communications receiver as recited in claim 13 wherein:
said baud detector means is responsive to said sample clock signal and said operating state of said filter pointer means for providing said local baud timing.

15. A data communications receiver as recited in claim 14 and further comprising:
bit clock means for providing a bit clock signal responsive to said local baud timing, said sample clock signal, and said operating state of said filter pointer means.

16. A data communications receiver as recited in claim 15 wherein said bit clock means comprises:
counter loading synchronization means for providing a synchronized load signal in response to said baud clock signal;
counter loading means for providing counter preset value signals in response to speed selection signals and said operating state; and
counter means for providing said bit clock signal in response to said counter preset value signals, and said synchronized load signal.

17. A method for providing local baud timing for a data communications receiver from baud timing contained in a received signal provided by a remote transmitter, comprising the steps of:
providing a sampled received signal by sampling said received signal at points determined by a sample clock signal having a fixed frequency;
providing a received baseband data signal by demodulating said sampled received signal;
providing an interpolated data signal in response to said received baseband data signal and a filter selection signal;
providing a set of complex adaptive equalizer filter coefficients in response to said interpolated data signal;
providing a dominant filter tap position signal in response to said set of complex adaptive equalizer filter coefficients;
providing a preferred dominant tap location signal in response to said dominant filter tap position signal;

providing a difference signal in response to said dominant filter tap position signal and said preferred dominant tap location signal;
providing an integrated signal in response to said difference signal; and
providing said filter selection signal and said local baud timing in response to said integrated signal and said sample clock signal.

18. A method for providing local baud timing for a data communications receiver as recited in claim 17 wherein said step of providing said dominant filter tap position signal comprises;
providing said dominant filter tap position signal by determining which pair of said complex adaptive equalizer filter coefficients has a squared magnitude greater than a squared magnitude of any other pair of said complex adaptive equalizer filter coefficients.

19. A method for providing local baud timing for a data communications receiver as recited in claim 17 wherein said step of providing said preferred dominant tap location comprises:
determining a difference between said dominant filter tap position signal and a center tap reference signal to provide an error signal;
providing a stored error signal and a stored preferred dominant tap location signal;
calculating a magnitude for said error signal and a magnitude for said stored error signal;
providing a stored magnitude of said error signal;
if said magnitude of said error signal is greater than said stored magnitude of said error signal then providing said preferred dominant tap location signal by summing said error signal and said stored preferred dominant tap location signal, and updating said stored error signal by equating said stored error signal to said error signal; and
if said magnitude of said error signal is less than said stored magnitude of said error signal then providing said preferred dominant tap location signal by summing said stored error signal and said stored preferred dominant tap location signal.

20. A method for providing local baud timing for a data communications receiver as recited in claim 17 wherein said step of providing said integrated signal comprises:
summing said difference signal and an amplified integrated signal to provide a sum signal;
providing said integrated signal by storing said sum signal; and
providing said amplified integrated signal by multiplying said integrated signal by a predetermined gain.

21. A method for providing local baud timing for a data communications receiver as recited in claim 17 wherein said step of providing said filter selection signal comprises:
summing said integrated signal and a stored counter signal to provide a counter signal;
storing said counter signal to provide said stored counter signal; and
truncating said stored counter signal to provide said filter selection signal.

22. A method for providing local baud timing for a data communications receiver as recited in claim 21 and further comprising the step of:
providing, in response to said fixed sample clock and said counter signal, said local baud timing and causing said interpolated data signal at a current sample point and two sample points prior to said current sample point to be used for providing said complex adaptive equalizer filter coefficients.

23. A method for providing local baud timing for a data communications receiver as recited in claim 22 and further comprising the step of:
providing a bit clock signal in response to said local baud timing, said sample clock signal, and an operating state responsive to said step of summing, said operating state comprising normal, overflow, and underflow conditions.

24. A method for providing local baud timing for a data communications receiver as recited in claim 23 wherein said step of providing a bit clock signal comprises:
providing a synchronized load signal in response to said local baud timing;
providing counter load value signals in response to speed selection signals and said operting state; and
providing said bit clock signal in response to said counter load value signals and said synchronized load signal.

25. A method of recovering local baud timing for a data communications receiver as recited in claim 17 wherein said step of providing a difference signal comprises:
subtracting said preferred center tap location signal from said dominant filter tap position signal to provide said integrated signal.

26. A method for determining a preferred dominant tap location in an adaptive equalizer which provides a set of complex adaptive equalizer filter coefficients, comprising the steps of:
calculating a squared magnitude for each pair of said complex adaptive equalizer filter coefficients;
comparing said squared magnitude for each pair of said complex adaptive equalizer filter coefficients to said squared magnitude for every other pair of said complex adaptive equalizer filter coefficients;
designating, as said dominant tap filter position, a filter tap position which provides a said pair of said complex adaptive equalizer filter coefficients having a said magnitude greater than a said magnitude of every other pair of said complex adaptive equalizer filter coefficients;
providing initial values for a center tap reference and said preferred dominant tap location;
determining a difference between said dominant filter tap position and said center tap reference to provide an error signal;
storing said error signal and said preferred dominant tap location to provide a stored error and a stored preferred dominant tap location, respectively;
calculating a magnitude for said error signal and a magnitude for said stored error signal;
providing a stored magnitude of said error;
when said magnitude of said error is greater than said stored magnitude of said error then determining said preferred dominant tap location by summing said error and said stored preferred dominant tap location, and updating said stored error by equating said stored error to said error; and
when said magnitude of said error is less than said stored magnitude of said error then determining said preferred dominant tap location by summing said stored error and said stored preferred dominant tap location.

27. For use with a data communications receiver for receiving an incoming signal provided by a remote transmitter, said incoming signal containing a remote baud timing established by said remote transmitter, an apparatus for synchronizing local baud timing in said data communications receiver to said remote baud timing, comprising:

clock means for providing a sample clock signal;

conversion means responsive to said sample clock signal for converting said incoming signal into a demodulated signal;

delay means for providing a set of predetermined delays and responsive to a delay selection signal for providing a delayed signal by delaying said demodulated signal by a selected one of said predetermined delays;

equalization means responsive to said delayed signal for providing an equalized signal to said data communications receiver and for providing a set of equalization coefficients; and filter control means responsive to said equalization coefficients and said sample clock signal for providing said local baud timing and for synchronizing said local baud timing to said remote baud timing by adjusting a cycle rate at which said delay selection signal cycles through said set of predetermined delays.

28. The apparatus of claim 27 wherein said conversion means comprises:

an analog-to-digital converter responsive to said sample clock signal for providing a sampled signal by sampling said incoming signal; and a demodulator for providing said demodulated signal by demodulating said sampled signal.

29. The apparatus of claim 27 wherein said delay means comprises an interpolating filter.

30. The apparatus of claim 27 wherein said equalization means is a fractionally spaced adaptive equalizer.

31. The apparatus of claim 27 wherein said delay means provides values for said delayed signal at a predetermined rate and said control means adjusts said local baud timing so that a selectable number of said values occurs in a baud time.

32. The apparatus of claim 31 and further comprising:

bit clock means responsive to a bit clock control signal provided by said control means for providing a bit clock signal to said data communications receiver.

33. The apparatus of claim 32 wherein said baud time is variable and said bit clock means provides a predetermined number of bit clock pulses for baud time.

34. The apparatus of claim 33 wherein said bit clock means provides said bit clock pulses by dividing a clock having a first frequency by a selectable number.

35. The apparatus of claim 27 wherein said control means is responsive to said equalization coefficients for determining a dominant tap location in said equalization means and adjusting said cycle rate so as to prevent said dominant tap location from moving.

36. For use with a data communications receiver for receiving an incoming signal provided by a remote transmitter, said incoming signal containing a remote baud timing established by said remote transmitter, a method for synchronizing local baud timing in said data communications receiver to said remote baud timing, comprising the steps of:

converting said incoming signal into a demodulated signal;

providing a set of predetermined delays;

delaying said demodulated signal by a selected one of said predetermined delays to provide a delayed signal;

cycling through said set of predetermined delays at a selectable cycle rate;

providing an equalized signal to said data communications receiver and providing a set of equalization coefficients responsive to said delayed signal; and synchronizing said local baud timing to said remote baud timing by adjusting said selectable cycle rate.

37. The method of claim 36 wherein said step of converting comprises:

providing a sampled signal by sampling said incoming signal at a predetermined sample rate; and demodulating said sample signal to provide said demodulated signal.

38. The method of claim 36 wherein:

said step of providing said delayed signal comprises providing values for said delayed signal at a predetermined rate; and said step of providing said equalized signal comprises adjusting said local baud timing so that a selectable number of said values occurs in a baud time.

39. The method of claim 38 and further comprising the step of providing a bit clock signal to said data communications receiver.

40. The method of claim 39 wherein said baud time is variable and said step of providing said bit clock signal comprises providing a fixed number of bit clock pulses per baud time.

41. The method of claim 40 wherein said step of providing said bit clock pulses comprises:

dividing a first clock frequency by a selectable number to produce said bit clock signal; and choosing said selectable number to provide said fixed number of bit clock pulses per baud time.

42. The method of claim 36 wherein said step of synchronizing comprises:

adjusting said cycle rate to minimize changes in said set of equalization coefficients.

43. The method of claim 42 wherein said step of adjusting comprises:

determining a pair of said equalization coefficients having a magnitude larger than any other pair of said equalization coefficients;

designating said pair having said larger magnitude as a dominant pair; and adjusting said cycle rate to prevent another pair of said equalization coefficients from becoming said dominant pair.

* * * * *